United States Patent [19]

Franck

[11] Patent Number: 4,989,383
[45] Date of Patent: Feb. 5, 1991

[54] APPARATUS AND METHOD FOR WINDOW INSTALLATION

[75] Inventor: Donald L. Franck, Warren, Mich.

[73] Assignee: General Motors Corporation, Detroit, Mich.

[21] Appl. No.: 496,094

[22] Filed: Mar. 15, 1990

Related U.S. Application Data

[63] Continuation of Ser. No. 160,662, Feb. 26, 1988, abandoned.

[51] Int. Cl.⁵ ............................ B60J 1/02; B60J 10/02
[52] U.S. Cl. ........................................ 52/400; 52/208; 296/93
[58] Field of Search ................. 52/208, 400; 296/93, 296/201, 96.21

[56] References Cited

U.S. PATENT DOCUMENTS

| | | |
|---|---|---|
| 2,270,036 | 1/1942 | Conlon . |
| 2,625,715 | 1/1953 | Beck ........................................ 296/93 |
| 2,759,575 | 8/1956 | Marvin . |
| 3,009,216 | 11/1961 | Kimber . |
| 4,001,994 | 1/1977 | Williams et al. ....................... 52/400 |
| 4,591,203 | 5/1986 | Furman . |
| 4,648,222 | 3/1987 | Miyata et al. .......................... 52/400 |

FOREIGN PATENT DOCUMENTS 546315  9/1957  Canada ................................ 296/93

*Primary Examiner*—Michael Safavi
*Attorney, Agent, or Firm*—Charles E. Leahy

[57] ABSTRACT

A molding for mounting a window panel in a window opening larger than the window panel includes a yieldable elastomeric body having a first groove adapted to receive an edge of the window panel and a second groove adapted to receive an edge of the body panel. The molding has a deformable hollow tubular member embedded therein and extending in parallel relationship with the grooves. After the molding and the window panel are installed in the opening the tubular member is crushed and the deformation of the tubular member spreads the elastomeric molding into permanent engagement with the window panel and/or the body panel to thereby permanently and sealingly mount the window in the vehicle body. The molding preferably includes a base portion which fits between the edge of the glass and the edge of the body panel and first and second spaced apart legs which define the groove receiving the edge of one of the panels. Third and fourth legs also extend from the body to define the second groove receiving the other panel. The fourth leg is shorter than the other legs so that the short leg facilitates assembly of the molding with respect to the two panels. Crushing of the tubular member spreads the fourth leg to permanently and fixedly mount the window on the vehicle body.

5 Claims, 1 Drawing Sheet

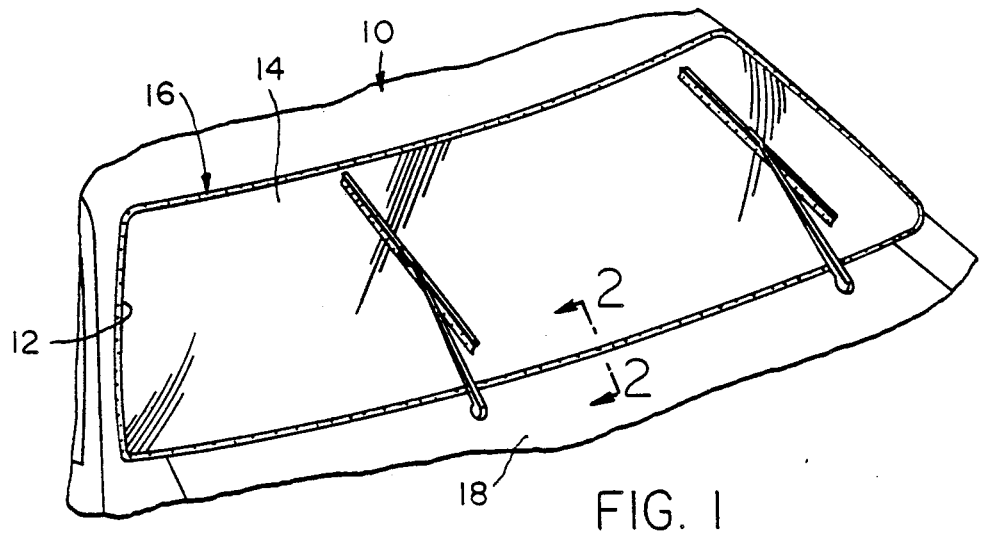
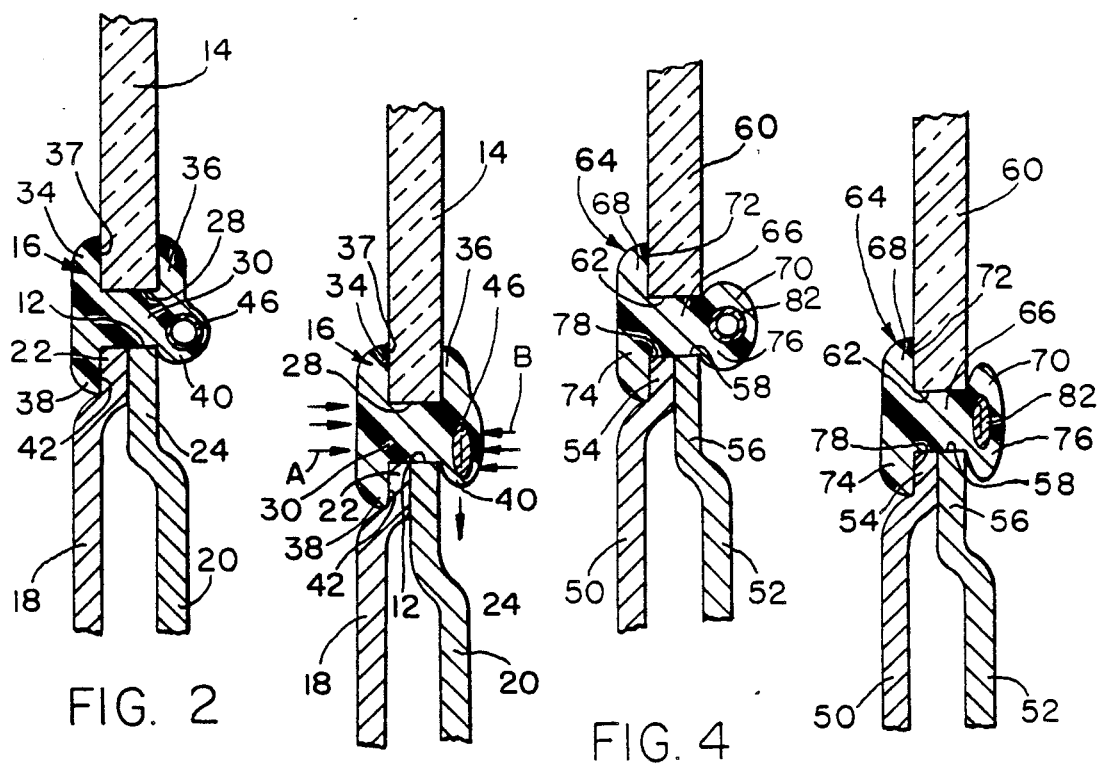

APPARATUS AND METHOD FOR WINDOW INSTALLATION

This is a continuation of application Ser. No. 07/160,662 filed on Feb. 26, 1988, now abandoned.

The invention relates to the installation of a window in an opening of a vehicle body, and more particularly, provides an improved molding and method for making a fixed window installation.

BACKGROUND OF THE INVENTION

It is well known in vehicle bodies to provide a window opening in sheet metal panels defining the roof of the vehicle. Window glass is fixedly installed in the openings to define the windshield, the back window, as well as side windows.

Many prior patents have taught the use of a molding which attaches and seals the window glass in a window opening. One such molding shown in U.S. Pat. No. 3,009,216 issued Nov. 21, 1961 to G. E. Kimber, is an elastomeric molding strip which engages the window and the body and has a wedge driven into a recess to spread a portion of the molding to engage the glass panel and mount the glass panel in the body. U.S. Pat. 4,591,203 issued May 27, 1986 to Herbert Furman, has the molding molded directly on to the window and includes integral studs or retainers which mechanically fasten to the body panel defining the opening.

The present invention provides a new and improved method and apparatus for installing a window in which a hollow tubular member is molded in situ inside the molding strip and is crushed to permanently distort the elastomeric strip into engagement with the adjacent body.

SUMMARY OF THE INVENTION

A molding for mounting a window panel in a window opening larger than the window panel includes a yieldable elastomeric body having a first groove adapted to receive an edge of the window panel and a second groove adapted to receive an edge of the body panel. The molding has a deformable hollow tubular member embedded therein and extending in parallel relationship with the grooves. After the molding and the window panel are installed in the opening the tubular member is crushed and the deformation of the tubular member spreads the elastomeric molding into permanent engagement with the window panel and/or the body panel to thereby permanently and sealingly mount the window in the vehicle body. The molding preferably includes a base portion which fits between the edge of the glass and the edge of the body panel and first and second spaced apart legs which define the groove receiving the edge of one of the panels. Third and fourth legs also extend from the body to define the second groove receiving the other panel. The fourth leg is shorter than the other legs so that the short leg facilitates assembly of the molding placing the window panel in the window opening. Crushing of the tubular member spreads the fourth leg to permanently and fixedly mount the window on the vehicle body.

BRIEF DESCRIPTION OF THE DRAWINGS

These and other objects, features and advantages of the invention will become apparent upon consideration of the description of the preferred embodiment and the appended drawings in which:

FIG. 1 is a perspective view of a vehicle body having a window mounted in a vehicle body opening according to the present invention;

FIG. 2 is a sectional view taken in the direction of arrows 2—2 and showing the deformable tubular member molded within the molding and the molding and the window panel positioned in the opening of the vehicle body;

FIG. 3 is a view similar to FIG. 2 but showing the application of force to the molding to crush the deformable tubular member and thereby spread the molding to mount and seal the window panel in the vehicle body opening;

FIGS. 4 and 5 are views similar to FIGS. 2 and 3 but show an alternate construction of the molding in which the crushing of the deformable tubular member spreads the molding into engagement with both the window panel and the body panel.

DESCRIPTION OF THE PROFFERED EMBODIMENT

Referring to FIG. 1, there is shown a vehicle body generally indicated at 10 having a window opening 12 in which a window panel 14 is mounted by a molding 16.

As best shown in FIG. 2, the vehicle body is comprised of an outer sheet metal panel 18 and an inner sheet metal panel 20 having edge portions 22 and 24 which are welded together and define the window opening 12. As seen in FIG. 2, the window panel 14 is smaller in size than the window opening 12 so that the edge 28 of the window panel 14 is spaced from the edge portions 22 and 24 of the vehicle body panels defining the window opening 12. The molding 16 is generally H-shaped in cross-section and includes a central base portion 30 which is interposed between the window panel edge 28 and the vehicle body opening 12. Molding 16 includes first and second spaced apart legs 34 and 36 defining a groove 37 which receives the window panel edge 28 so that the legs 34 and 36 overlie an engage with the faces of the window panel 14. In addition, the molding 16 includes a third leg 38 and a fourth leg 40 which cooperate to define a groove 42 receiving the edge portions 22 and 24 of the body panels. As seen in FIG. 2, the third leg 38 overlies the outer panel 18, but the inner fourth leg 40 is of substantially shorter length than the third leg 38. Furthermore, as seen in FIG. 2, a hollow tubular member 46 of deformable metal, is molded in place of the molding 16.

As seen in FIG. 1, the molding 16 encircles the window panel 14. The molding 16 may be molded in situ upon the window panel 14 by loading the window panel 14 into the mold and then injecting the elastomeric material, such as urethane, to form the molding 16. On the other hand, the molding 16 may be injection molded of elastomeric material in the form of a ring which is then stretched somewhat to fit over the window panel 14. Alternatively, the molding 16 may be extruded elastomeric material with the tubular member 46 coextruded therewith. The molding extrusion is then cut to length and bent around the window panel 14 to completely encircle the window panel 14.

As seen in FIG. 2, the window panel 14, with the molding 16 engaged thereon, is installed onto the vehicle body by pushing the central base portion 30 of the molding 16 through the window opening 12 as permitted by contraction of the short fourth leg 40. The short fourth leg 40 overlaps the panel edge portion 24 slightly to retain and position the window panel 14 in the window opening 12. This installation of the window panel 14 into window opening 12 may be advantageously implemented by a robot.

Referring to FIG. 3, it is seen that the application of a holding force to the outside of the molding 16 as represented by arrows "A", and the simultaneous application of the compressing force in the direction of arrow "B" causes the elastomeric material to collapse and to collapse and deform the hollow tubular member 46. This deformation of the tubular member 46 is a permanent deformation and works to permanently spread the short fourth leg 40 over the edge portion 24 of the inner panel 20. Accordingly, the short fourth leg 40 assumes a position overlying and engaging the adjacent wall of the body inner panel 20, thereby cooperating with the first leg 34, second leg 36 and third leg 38 to permanently and sealingly mount the window panel 14 in the vehicle body opening 12.

FIGS. 4 and 5 disclose a second embodiment of the invention. According to FIG. 4, the vehicle body is comprised of outer sheet metal panel 50 and inner sheet metal 52 having edge portions 54 and 56 defining window opening 58. Window panel 60 is smaller in size than the window opening 58 so that the edge 62 of the window panel 60 is spaced from the edge portions 54 and 56 of the vehicle body panels defining the window opening 58. The molding 64 includes a central base portion 66 which extends between the window panel edge 62 and the vehicle body opening 58. The molding 64 includes a first long leg 68 and a second short leg 70 defining a groove 72 which receives the window panel edge 62. In addition the molding 64 includes a third leg 74 and a fourth leg 76 which cooperate to define a groove 78 receiving the edge portions 54 and 56 of the body panels. As seen in FIG. 4, the first leg 68 and the third leg 74 are of sufficient length to respectively overlie the outer face of the window panel 60 and the outer face of the body outer panel 50. On the other hand, the second leg 70 and the fourth leg 76 are of substantially shorter length to permit and facilitate the insertion of the molding 64 between the window panel 60 and the edge portions 54 and 56 of the body panels, and yet also temporarily retain the molding in its FIG. 4 position between the body panels and the window panel. As seen in FIG. 4, a hollow tubular member 82 is embedded in the molding 64 and centered between the short second leg 70 and the short fourth leg 76. Thus, the short second leg 70 and fourth leg 76 and the hollow tubular member cooperate to define a bulbous end portion of the central base portion.

As seen in FIG. 5, the application of compressive forces to the molding crush the tubular member 82 so that the short second leg 70 and short fourth leg 76 are forcibly spread outwardly into overlying engagement respectively with the window panel 60 and the inner body panel 52. Accordingly, the molding 64 is permanently mounted at its FIG. 5 position and effectively mounts the window panel 60 in the window opening 58.

It will be understood that although the hollow tubular member is shown in the drawings as a metallic cylindrical tube, any hollow tubular member could be employed. For example, the tubular member could have an oval cross-section, a square cross-section, or the like. Furthermore, the hollow tubular member could be constructed of any material which would retain its flattened shape when forcibly collapsed.

It will be understood that the invention may be practiced using a molding of any suitable material having elastomeric qualities by which the molding may be yielded to tightly engage with the adjacent panel. Furthermore, although the method of installation is described herein as installing the molding on the glass and then installing the glass on the body. The invention can also be practiced by installing the molding on the vehicle body and then installing the glass into the molding. Furthermore, the molding FIGS. 4 and 5 are suited to being installed by holding the window panel in the window opening and then inserting the molding in place between the panels.

In addition, the molding may be installed with tubular members either inside the vehicle or outside the vehicle.

Furthermore, adhesives and/or sealants may be employed in the grooves or the molding if desired.

Thus it is seen that the invention provides a new and improved device and method for fixedly mounting a window panel in a vehicle body opening.

The embodiments of the invention in which an exclusive property or privilege is claimed are defined as follows:

1. A device for mounting and sealing the edge of a window panel in a vehicle body panel having an opening defined by an edge, comprising:
 a one-piece yieldable elastomeric molding having a first groove adapted to receive an edge of the window panel and a second groove adapted to receive an edge of the body panel, said molding having a deformable hollow tubular member embedded therein and extending in parallel relationship with the grooves, said tubular member acting upon deformation thereof to spread the molding into encapsulating containment of the window panel and the body panel whereby the molding acts to permanently and fixedly and sealingly mount the window in the vehicle body.

2. A device for mounting and sealing the edge of a window panel in a vehicle body panel having an opening defined by an edge, comprising:
 a one-piece yieldable elastomeric molding having a an H-shaped cross-section including a base portion adapted to be interposed between the edges of the panels, first and second spaced apart legs defining a first groove for receiving the edge of one of the panels, third and fourth spaced apart legs defining a second groove for receiving the edge of the body panel, three of the four legs having a sufficient length to overlie and engage the panel to and effectively retain and contain the edges of the panels in the grooves of the molding, and the fourth leg being shorter in length than the other legs, and a deformable hollow tubular member embedded in the molding and extending in parallel relationship with the fourth leg and acting upon deformation thereof to spread the fourth leg into overlying engagement of the adjacent panel whereby the molding acts to permanently and fixedly and sealingly mount the window in the vehicle body.

3. A device for mounting and sealing the edge of a window panel in a vehicle body panel having an opening defined by an edge, comprising:
 a one-piece yieldable elastomeric molding having a base portion adapted to be interposed between the edge of the panels, a pair of legs projecting from the base portion and adapted to respectively overlie and engage with the window panel and the vehicle body panel to thereby position the molding with respect to the window panel and the vehicle body panel, and a bulbous end portion integral with the base portion at the end thereof opposite the pair of legs, said bulbous end portion having a deformable hollow tubular member embedded therein, said deformable hollow member acting upon deformation thereof to spread the bulbous end portion into overlying engagement of the window panel and the body panel whereby the molding acts to permanently and fixedly and sealingly mount the window in the vehicle body.

4. A vehicle body window installation comprising:

a body panel having a window opening defined by an edge of a body panel;

a one-piece window panel somewhat smaller than the opening and having an edge spaced from the edge of the opening in the body panel;

and a yieldable elastomeric molding having a first groove adapted to receive an edge of the window panel and a second groove adapted to receive an edge of the body panel so that the molding fills the space between the panels, said molding having a deformable hollow tubular member embedded therein and extending in parallel relationship with the grooves around the window panel and the opening, said tubular member acting upon deformation thereof to spread the molding into encapsulating containment of the widow panel and the body panel whereby the molding acts to permanently and fixedly and sealingly mount the window in the vehicle body.

5. A method of mounting the edge of a window panel in an opening defined by the edge of a vehicle body panel;

installing a molding between the window panel and the body panel, said molding being of a yieldable elastomeric material and having a first groove adapted to receive an edge of the window panel and a second groove adapted to receive an edge of the body panel, said molding having a deformable hollow tubular member embedded therein and extending in parallel relationship with the grooves; and forcibly compressing the molding and the deformable hollow tubular member so that the molding is spread into encapsulating containment of the window panel and the body panel and the hollow tubular member is permanently deformed whereby the deformed hollow tubular member and the yieldable elastomeric material act to permanently and fixedly and sealingly mount the window in the vehicle body.

* * * * *